United States Patent
Hamakubo et al.

(10) Patent No.: US 11,947,161 B2
(45) Date of Patent: *Apr. 2, 2024

(54) RESIN COMPOSITION, OPTICAL FIBER SECONDARY COATING MATERIAL, OPTICAL FIBER AND MANUFACTURING METHOD OF OPTICAL FIBER

(71) Applicant: SUMITOMO ELECTRIC INDUSTRIES, LTD., Osaka (JP)

(72) Inventors: Katsushi Hamakubo, Osaka (JP); Kazuyuki Sohma, Osaka (JP); Kazuya Tokuda, Osaka (JP); Tatsuya Konishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 406 days.

This patent is subject to a terminal disclaimer.

(21) Appl. No.: 17/295,982

(22) PCT Filed: Jun. 5, 2020

(86) PCT No.: PCT/JP2020/022330
§ 371 (c)(1),
(2) Date: May 21, 2021

(87) PCT Pub. No.: WO2020/250826
PCT Pub. Date: Dec. 17, 2020

(65) Prior Publication Data
US 2022/0026631 A1 Jan. 27, 2022

(30) Foreign Application Priority Data

Jun. 11, 2019 (JP) ................................. 2019-108595

(51) Int. Cl.
*G02B 6/02* (2006.01)
*C03C 25/1065* (2018.01)
(Continued)

(52) U.S. Cl.
CPC ...... *G02B 6/02395* (2013.01); *C03C 25/1065* (2013.01); *C03C 25/326* (2013.01);
(Continued)

(58) Field of Classification Search
CPC .. G02B 6/02395; G02B 6/02; C03C 25/1065; C03C 25/326; C03C 25/47; C03C 25/6226; C08F 290/067; C08K 3/36; C09D 175/14
See application file for complete search history.

(56) References Cited

U.S. PATENT DOCUMENTS

2012/0321265 A1  12/2012  Terruzzi et al.
2016/0299310 A1  10/2016  Kaneko et al.
(Continued)

FOREIGN PATENT DOCUMENTS

EP     1930381 A1    6/2008
JP     S61-217011 A  9/1986
(Continued)

OTHER PUBLICATIONS

I. S. Fedorova and P. Schmidt, "A General Analytical Method for Calculating Particle-Dimension Distributions from Scattering Data," Journal of Applied Crystallography, vol. 11, 1978, p. 405-p. 411.
(Continued)

*Primary Examiner* — Jennifer Doan
(74) *Attorney, Agent, or Firm* — Faegre Drinker Biddle & Reath LLP

(57) ABSTRACT

A resin composition comprises: a base resin containing an oligomer, a monomer, and a photopolymerization initiator; and inorganic oxide particles, wherein the inorganic oxide particles are lump-shaped aggregated particles, and the volume average particle size of the inorganic oxide particles measured by an X-ray small angle scattering method is 5 nm or more and 800 nm or less.

17 Claims, 3 Drawing Sheets

(51) Int. Cl.
*C03C 25/326* (2018.01)
*C03C 25/47* (2018.01)
*C03C 25/6226* (2018.01)
*C08F 290/06* (2006.01)
*C08K 3/36* (2006.01)
*C09D 175/14* (2006.01)

(52) U.S. Cl.
CPC .......... *C03C 25/47* (2018.01); *C03C 25/6226* (2013.01); *C08F 290/067* (2013.01); *C08K 3/36* (2013.01); *C09D 175/14* (2013.01)

(56) References Cited

U.S. PATENT DOCUMENTS

2019/0300697 A1* 10/2019 Gallegos ................. C08L 63/00
2020/0199267 A1* 6/2020 Korshikov ........ C08F 122/1006
2021/0230337 A1 7/2021 Hamakubo et al.
2022/0041500 A1 2/2022 Hamakubo et al.

FOREIGN PATENT DOCUMENTS

| JP | 2014-219550 A | 11/2014 |
| WO | WO-2016/080195 A1 | 5/2016 |
| WO | WO-2020/171083 A1 | 8/2020 |

OTHER PUBLICATIONS

Peerapan Dittanet et al., "Effect of bimodal particle size distributions on the toughening mechanisms in silica nanoparticle filled epoxy resin," Polymer, Elsevier, vol. 54, No. 7, Jan. 21, 2013, p. 1832-p. 1845, XP028990617.

U.S. Office Action dated Jul. 31, 2023 in U.S. Appl. No. 17/278,766.

U.S. Notice of Allowance dated Aug. 31, 2023 in U.S. Appl. No. 17/278,766.

* cited by examiner

RESIN COMPOSITION, OPTICAL FIBER SECONDARY COATING MATERIAL, OPTICAL FIBER AND MANUFACTURING METHOD OF OPTICAL FIBER This application claims priority based on Japanese Patent Application No. 2019-108595 filed on Jun. 11, 2019, and incorporates all the contents described in the Japanese application.

TECHNICAL FIELD

The present disclosure relates to a resin composition, a secondary coating material for an optical fiber, an optical fiber, and a method for manufacturing an optical fiber.

BACKGROUND ART

An optical fiber has generally a coating resin layer for protecting a glass fiber that is an optical transmission medium. The coating resin layer generally comprises a primary resin layer and a secondary resin layer.

In order to identify an optical fiber, a colored layer may be formed on the outermost layer of the optical fiber. It is known that the colored layer is formed on the outer periphery of the secondary resin layer by temporarily winding the optical fiber coated with the primary resin layer and the secondary resin layer and then feeding out the optical fiber again (for example, refer to Patent Literature 1).

CITATION LIST

Patent Literature

[Patent Literature 1] WO 2016/080195 A1

SUMMARY OF INVENTION

A resin composition according to an aspect of the present disclosure comprises: a base resin containing an oligomer, a monomer, and a photopolymerization initiator; and inorganic oxide particles, wherein the inorganic oxide particles are lump-shaped aggregated particles, and the volume average particle size of the inorganic oxide particles measured by an X-ray small angle scattering method is 5 nm or more and 800 nm or less.

DESCRIPTION OF EMBODIMENTS

Figure 1:
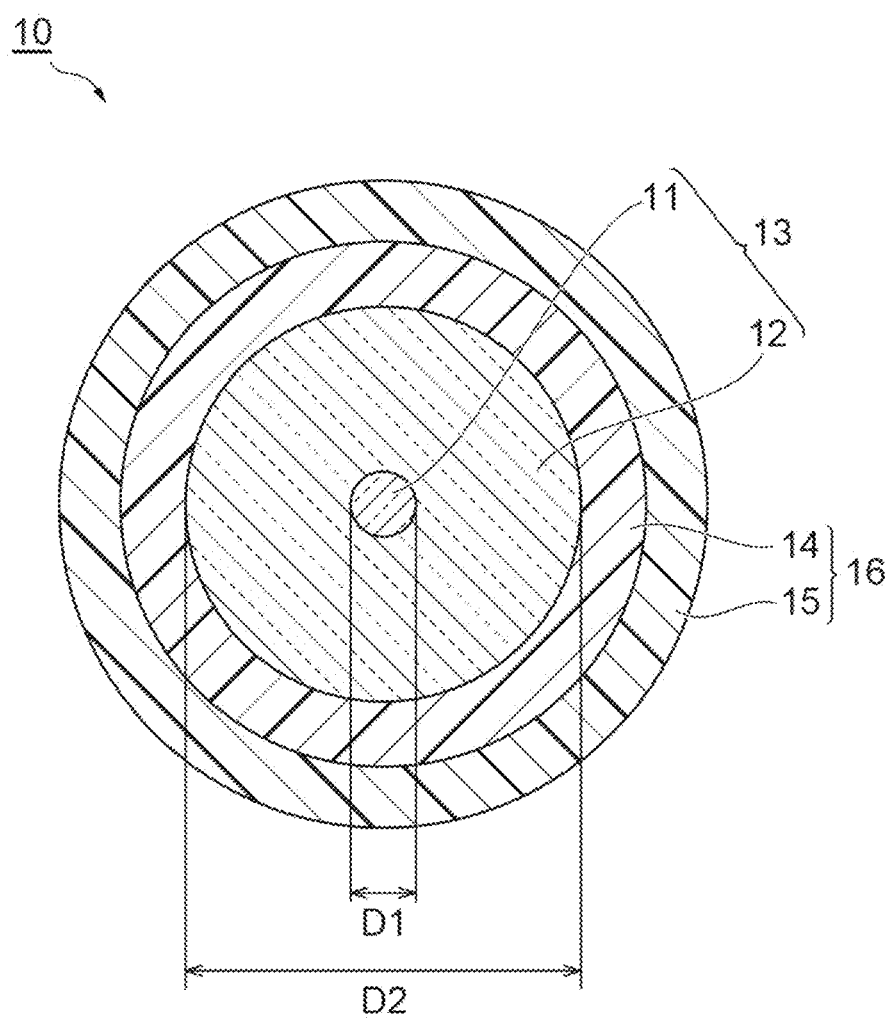
FIG. 1 is a schematic cross-section diagram showing an example of the optical fiber according to the present embodiment.

Problem to be Solved by the Present Disclosure

In the shipment of an optical fiber, a rewinding work may be performed from a large bobbin to a small bobbin. When the scratch resistance of the surface of the secondary resin layer is low, scratches may be generated on the surface of the secondary resin layer in winding, and the resin layer may be broken to significantly deteriorate the optical characteristics. Therefore, the secondary resin layer is required to have excellent scratch resistance (abrasion resistance).

An object of the present disclosure is to provide: a resin composition capable of forming a coating resin layer having excellent scratch resistance; and an optical fiber comprising a secondary resin layer formed from the resin composition and capable of preventing scratches in a rewinding work.

Effect of the Present Disclosure

The present disclosure can provide: a resin composition capable of forming a coating resin layer having excellent scratch resistance; and an optical fiber comprising a secondary resin layer formed from the resin composition and capable of preventing scratches in a rewinding work.

Description of Embodiments of the Present Disclosure

First, the contents of the embodiment of the present disclosure will be described by listing them. A resin composition according to an aspect of the present disclosure comprises: a base resin containing an oligomer, a monomer, and a photopolymerization initiator; and inorganic oxide particles, wherein the inorganic oxide particles are lump-shaped aggregated particles, and the volume average particle size of the inorganic oxide particles measured by an X-ray small angle scattering method is 5 nm or more and 800 nm or less. The above resin composition can be preferably used as an ultraviolet curable resin composition for coating an optical fiber.

Using lump-shaped aggregated particles having a certain specific volume average particle size as the inorganic oxide particles can form a coating resin layer having excellent scratch resistance.

From the viewpoint of further improving the scratch resistance of the coating resin layer, the normalized dispersion of the volume average particle size of the inorganic oxide particles may be 40% or more.

From the viewpoint of forming the resin layer having a high Young's modulus, the content of the inorganic oxide particles may be 1% by mass or more and 60% by mass or less based on the total amount of the oligomer, monomer, and inorganic oxide particles.

Due to excellent dispersion properties in the resin composition and easy adjustment of Young's modulus, the inorganic oxide particles may be particles including at least one selected from the group consisting of silicon dioxide, zirconium dioxide, aluminum oxide, magnesium oxide, titanium oxide, tin oxide, and zinc oxide.

The secondary coating material for the optical fiber according to an aspect of the present disclosure comprises the above resin composition. A coating resin layer having excellent scratch resistance can be formed by using the resin composition according to the present embodiment in the secondary resin layer.

The optical fiber according to an aspect of the present disclosure comprises: a glass fiber comprising a core and a cladding; a primary resin layer being in contact with the glass fiber and coating the glass fiber; and a secondary resin layer coating the primary resin layer, wherein the secondary resin layer comprises a cured product of the above resin composition. In addition, the secondary resin layer according to an aspect of the present disclosure comprises inorganic oxide particles, wherein the inorganic oxide particles are lump-shaped aggregated particles, and the volume average particle size of the inorganic oxide particles measured by an X-ray small angle scattering method is 5 nm or more and 800 nm or less. This can prevent the surface of the secondary resin layer from being damaged and the resin layer from being broken when the rewinding work is performed from the large bobbin to the small bobbin.

A method for manufacturing the optical fiber according to an aspect of the present disclosure comprises: an application step of applying the above resin composition to the outer periphery of a glass fiber composed of a core and a cladding; and a curing step of curing the resin composition by irradiating with ultraviolet rays after the application step. This can produce an optical fiber capable of preventing scratches in the rewinding work.

Detail of Embodiment of the Present Disclosure

Specific examples of a resin composition and an optical fiber according to the embodiments of the present disclosure will be described referring to the drawing as necessary. The present invention is not limited to these illustrations but is indicated by the claims and intended to include meanings equivalent to the claims and all modifications within the claims. In the following description, the same reference numerals are given to the same elements in the description of the drawing, and redundant explanations are omitted.

<Resin Composition>

The resin composition according to the present embodiment comprises a base resin containing an oligomer, a monomer and a photopolymerization initiator, and inorganic oxide particles.

(Inorganic Oxide Particles)

The inorganic oxide particles according to the present embodiment are lump-shaped aggregated particles. In general, the inorganic oxide particles can be produced by a gas phase method, a liquid phase method, or a solid phase method, and it is known that the shape of particles varies depending on the production method. Particles produced by the liquid phase method have spherical shape, and particles produced by the gas phase method have lump shape with a certain aggregation structure. The lump-shaped aggregated particles produced by the gas phase method can be used as the inorganic oxide particles according to the present embodiment. Using lump-shaped aggregated particles can form a resin layer having excellent scratch resistance.

The inorganic oxide particles are not particularly limited, but due to excellent dispersion properties in the resin composition and easy adjustment of the Young's modulus, it is preferable that the above inorganic oxide particles are particles comprising at least one selected from the group consisting of silicon dioxide (silica), zirconium dioxide (zirconia), aluminum oxide (alumina), magnesium oxide (magnesia), titanium oxide (titania), tin oxide, and zinc oxide. From the viewpoints such as inexpensiveness, easy surface treatment, permeability to ultraviolet ray, and easy provision of a resin layer with appropriate hardness, silica particles produced by the gas phase method are more preferable to be used as the aggregated particles according to the present embodiment (hereinafter sometimes referred to as "gas phase method silica particles").

The surface of the aggregated particles according to the present embodiment is preferably subjected to hydrophobic treatment with a silane compound. The hydrophobic treatment according to the present embodiment is introduction of a hydrophobic group onto the surface of the aggregated particles. The aggregated particles having a hydrophobic group introduced can be dispersed in the resin composition with the initial aggregated structure maintained. The hydrophobic group may be an ultraviolet curable reactive group such as a (meth)acryloyl group or a vinyl group, or a non-reactive group such as a hydrocarbon group (for example, an alkyl group) or an aryl group (for example, a phenyl group). In the case of the aggregated particles having a reactive group, the resin layer having high Young's modulus is easy to form.

Examples of the silane compound having a reactive group include 3-methacryloxypropyltrimethoxysilane, 3-acryloxypropyltrimethoxysilane, 3-methacryloxypropyltriethoxysilane, 3-acryloxypropyltriethoxysilane, 8-methacryloxyoctyltrimethoxysilane, 8-acryloxyoctyltrimethoxysilane, 7-octenyltrimethoxysilane, vinyltrimethoxysilane, and vinyltriethoxysilane.

Examples of the silane compound having an alkyl group include methyltrimethoxysilane, dimethyldimethoxysilane, ethyltrimethoxysilane, propyltrimethoxysilane, butyltrimethoxysilane, pentyltrimethoxysilane, hexyltrimethoxysilane, octyltrimethoxysilane, methyltriethoxysilane, dimethyldiethoxysilane, ethyltriethoxysilane, propyltriethoxysilane, butyltriethoxysilane, pentyltriethoxysilane, hexyltriethoxysilane, and octyltriethoxysilane.

Examples of the silane compound having a phenyl group include phenyltrimethoxysilane and phenyltriethoxysilane.

The inorganic oxide particles according to the present embodiment are dispersed in a dispersion medium. Using the inorganic oxide particles dispersed in the dispersion medium allows for uniform dispersion of the inorganic oxide particles in the resin composition without further aggregation of the initial aggregated particles and then improvement of the storage stability of the resin composition. The dispersion medium is not particularly limited as long as curing of the resin composition is not obstructed. The dispersion medium may be reactive or non-reactive.

A monomer such as a (meth)acryloyl compound and an epoxy compound can be used as the reactive dispersion medium. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, polytetramethylene glycol di(meth)acrylate, 2-hydroxy-3-phenoxypropyl acrylate, (meth)acrylic acid adduct of propylene glycol diglycidyl ether, (meta)acrylic acid adduct of tripropylene glycol diglycidyl ether, and (meth)acrylic acid adduct of glycerin diglycidyl ether. (Meth)acryloyl compounds exemplified by the monomers described later may be used as the dispersion medium.

A ketone solvent such as methyl ethyl ketone (MEK), an alcohol solvent such as methanol (MeOH), or an ester solvent such as propylene glycol monomethyl ether acetate (PGMEA) may be used as a non-reactive dispersion medium. In the case of the non-reactive dispersion medium, the resin composition may be prepared by mixing the base resin and the inorganic oxide particles dispersed in the dispersion medium and removing a part of the dispersion medium.

The inorganic oxide particles dispersed in the dispersion medium remains to be dispersed in the resin layer after curing of the resin composition without further aggregation of lump-shaped aggregated particles. When a reactive dispersion medium is used, the inorganic oxide particles are mixed with the dispersion medium in the resin composition and are incorporated in the resin layer with the dispersion condition maintained. When a non-reactive dispersion medium is used, at least a part of the dispersion medium evaporates and disappears from the resin composition, but the inorganic oxide particles remain in the resin composition with the dispersion condition remained and are also present in the cured resin layer with the dispersion condition remained.

When the resin composition is analyzed by the X-ray small angle scattering method, the volume average particle size of the inorganic oxide particles measured by the X-ray small angle scattering method is 5 nm or more and 800 nm or less. This can form the resin layer having excellent scratch resistance. The volume average particle size may be 20 nm or more and 780 nm or less, 25 nm or more and 750 nm or less, or 30 nm or more and 700 nm or less.

From the viewpoint of forming a resin layer more excellent in scratch resistance, the normalized dispersion of the volume average particle size is preferably 40% or more, more preferably more than 40%, further preferably 42% or more, and particularly preferably 45% or more.

From the viewpoint of well maintaining the dispersion properties of the inorganic oxide particles, the normalized dispersion of the volume average particle size is preferably 95% or less, more preferably 90% or less, and further preferably 85% or less.

The volume average particle size and the normalized dispersion of the inorganic oxide particles in the resin composition can be varied by using inorganic oxide particles produced by the gas phase method and adjusting the surface treatment of the inorganic oxide particles.

The X-ray small angle scattering method is a method of analyzing X-ray scattering intensity obtained at a scattering angle of 5° or less to quantify the shape, distribution, and the like of a scatterer. The volume average particle size and the normalized dispersion indicating the variation of the particle size can be obtained from the scattering intensity profile of X-rays. That is, the volume average particle size and the normalized dispersion thereof can be obtained by performing fitting by a nonlinear least squares method so that the measured X-ray scattering intensity and the X-ray scattering intensity calculated from the theoretical equation represented by the function of the particle size and the particle size distribution are approximate to each other.

It is known that such an X-ray scattering intensity profile is analyzed to obtain a particle size distribution of fine scatterers, and as an analysis method thereof, for example, a known analysis method by Schmidt et al., for example, a method described in I. S. Fedorova and P. Schmidt: J. Appl. Cryst. 11, 405, 1978 can be used.

The content of the inorganic oxide particles is preferably 1% by mass or more and 60% by mass or less, may be 2% by mass or more and 50% by mass or less, may be 5% by mass or more and 40% by mass or less, and may be 10% by mass or more and 35% by mass or less based on the total amount of the oligomer, monomer, and inorganic oxide particles. The content of the inorganic oxide particles of 1% by mass or more allows easy formation of a resin layer having a high Young's modulus. The content of the inorganic oxide particles of 60% by mass or less results in easy improvement in the application properties of the resin composition and thus allows formation of the resin layer having excellent toughness.

(Base Resin)

The base resin according to the present embodiment contains an oligomer, a monomer, and a photopolymerization initiator.

The oligomer preferably contains a urethane (meth)acrylate oligomer. An oligomer obtained by reacting a polyol compound, a polyisocyanate compound, and a hydroxyl group-containing (meth)acrylate compound can be used as the urethane (meth)acrylate oligomer.

(Meth)acrylate means an acrylate or a methacrylate corresponding to it. The same applies to (meth)acrylic acid.

Examples of the polyol compound include polytetramethylene glycol, polypropylene glycol and bisphenol A-ethylene oxide addition diol. Examples of the polyisocyanate compound includes 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol mono(meth)acrylate.

From the viewpoint of adjusting the Young's modulus of the resin layer, the number average molecular weight (Mn) of the polyol compound may be 300 or more and 3000 or less.

As a catalyst for synthesizing urethane (meth)acrylate oligomer, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the viewpoint of easy availability or catalyst performance, it is preferable that dibutyltin dilaurate or dibutyltin diacetate be used as catalyst.

When urethane (meth)acrylate oligomer is synthesized, lower alcohols having 5 or less carbon atoms may be used. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

The oligomer may further contain an epoxy (meth)acrylate oligomer. The oligomer obtained by reacting a compound having a (meth)acryloyl group with an epoxy resin having two or more glycidyl groups can be used as an epoxy (meth)acrylate oligomer.

The monofunctional monomer having one polymerizable group and the multifunctional monomer having two or more polymerizable groups can be used as the monomer. A monomer may be used by mixing two or more monomers.

Examples of the monofunctional monomer include (meth)acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butylcyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxypolyethylene glycol (meth)acrylate, and isobornyl (meth)acrylate; carboxyl group containing monomers such as (meth)acrylic acid, (meth)acrylic acid dimer, carboxyethyl (meth)acrylate, carboxypentyl (meth)acrylate, and o-carboxy-polycaprolactone (meth)acrylate; heterocycle containing (meth)acrylate such as N-acryloyl morpholine, N-vinyl pyrrolidone, N-vinyl caprolactam, N-acryloylpiperidine, N-methacryloylpiperidine, N-acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; N-substituted amide monomers such as (meth)acrylamide, N, N-dimethyl (meth)acrylamide, N, N-diethyl (meth)acrylamide, N-hexyl (meth)acrylamide, N-methyl (meth)acrylamide, N-butyl (meth)acrylamide, N-butyl (meth)acrylamide, N-methylol (meth)acrylamide, and N-methylolpropane (meth)acrylamide; aminoalkyl (meth)acrylate monomers such as aminoethyl (meth)acrylate, aminopropyl (meth)acrylate, N, N-dimethylaminoethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the multifunctional monomer include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyldiol di(meth)acrylate, 3-ethyl-1,8-octanediol di(meth)acrylate, EO adduct of bisphenol A di(meth)acrylate, trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris [(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate and caprolactone-modified tris[(meth)acryloyloxyethyl] isocyanurate.

The photopolymerization initiator can be appropriately selected from known radical photopolymerization initiators and used. Examples of the photopolymerization initiator include 1-hydroxycyclohexyl phenyl ketone (Omnirad 184, manufactured by IGM Resins), 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Omnirad 907 manufactured by IGM Resins), 2,4,6-trimethylbenzoyldiphenylphosphine oxide (Omnirad TPO manufactured by IGM Resins), and bis(2,4,6-trimethylbenzoyl) phenylphosphine oxide (Omnirad 819, manufactured by IGM Resins).

The resin composition may further contain a silane coupling agent, a leveling agent, an antifoaming agent, an antioxidant, a sensitizer, or the like.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris((3-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropyl benzothiazyl tetrasulfide.

The viscosity of the resin composition according to the present embodiment is preferably 300 mPa·s or more and 5000 mPa·s or less at 45° C., more preferably 400 mPa·s or more and 4500 mPa·s or less, and further more preferably 500 mPa·s or more and 3500 mPa·s or less. The viscosity of the resin composition is in the above range, which can improve the application properties of the resin composition.

The resin composition according to the present embodiment is preferably used as the secondary coating material for the optical fiber. Using the resin composition according to the present embodiment for the secondary resin layer can form the coating resin layer having excellent scratch resistance.

<Optical Fiber>

FIG. 1 is a schematic cross-section diagram showing an example of the optical fiber according to the present embodiment. The optical fiber 10 comprises the glass fiber 13 including the core 11 and the cladding 12, and the coating resin layer 16 including the primary resin layer 14 provided on the outer periphery of the glass fiber 13 and the secondary resin layer 15.

The cladding 12 surrounds the core 11. The core 11 and the cladding 12 mainly include glass such as silica glass, germanium-added silica glass or pure silica glass can be used, for example, in the core 11, and pure silica glass or fluorine-added silica glass can be used in the cladding 12.

In FIG. 1, for example, the outside diameter (D2) of the glass fiber 13 is about 100 μm to 125 μm, and the diameter (D1) of the core 11 constituting the glass fiber 13 is about 7 μm to 15 μm. The thickness of the coating resin layer 16 is typically about 22 μm to 70 μm. The thickness of each of the primary resin layer 14 and the secondary resin layer 15 may be about 5 μm to 50 μm.

When the outside diameter (D2) of the glass fiber 13 is about 125 μm and the thickness of the coating resin layer 16 is 60 μm or more and 70 μm or less, the thickness of each of the primary resin layer 14 and the secondary resin layer 15 may be about 10 μm to 50 μm, and for example, the thickness of the primary resin layer 14 may be 35 μm and the thickness of the secondary resin layer 15 may be 25 μm. The outside diameter of the optical fiber 10 may be about 245 μm to 265 μm.

When the outside diameter (D2) of the glass fiber 13 is about 125 μm and the thickness of the coating resin layer 16 is 27 μm or more and 48 μm or less, the thickness of each of the primary resin layer 14 and the secondary resin layer 15 may be about 10 μm to 38 μm, and for example, the thickness of the primary resin layer 14 may be 25 μm and the thickness of the secondary resin layer 15 may be 10 μm. The outside diameter of the optical fiber 10 may be about 179 μm to 221 μm.

When the outside diameter (D2) of the glass fiber 13 is about 100 μm and the thickness of the coating resin layer 16 is 22 μm or more and 37 μm or less, the thickness of each of the primary resin layer 14 and the secondary resin layer 15 may be about 5 μm to 32 μm, and for example, the thickness of the primary resin layer 14 may be 25 μm and the thickness of the secondary resin layer 15 may be 10 µm. The outside diameter of the optical fiber 10 may be about 144 µm to 174 µm.

The resin composition according to the present embodiment can be applied to the secondary resin layer. The secondary resin layer can be formed by curing a resin composition including the above inorganic oxide particles and the base resin. The secondary resin layer comprises inorganic oxide particles, wherein the inorganic oxide particles are lump-shaped aggregated particles, and the volume average particle size of the inorganic oxide particles measured by an X-ray small angle scattering method is 5 nm or more and 800 nm or less. This can prevent the surface of the secondary resin layer from being damaged and the resin layer from being broken when the rewinding work is performed from the large bobbin to the small bobbin. In addition, the anti-blocking effect prevents the fibers from sticking to each other, and the optical fiber can be wound around the small bobbin without winding abnormality such as winding skip.

A method for manufacturing the optical fiber according to the present embodiment comprises: an application step of applying the above resin composition to the outer periphery of a glass fiber composed of a core and a cladding; and a curing step of curing the resin composition by irradiating with ultraviolet rays after the application step.

The Young's modulus of the secondary resin layer is preferably 1300 MPa or more at 23° C., more preferably 1300 MPa or more and 3600 MPa or less, and further preferably 1400 MPa or more and 3000 MPa or less. The Young's modulus of the secondary resin layer of 1300 MPa or more is easy to improve the lateral pressure characteristics, and the Young's modulus of 3600 MPa or less can provide proper toughness to the secondary resin layer, and thus can be hard to occur a crack or the like in the secondary resin layer.

The primary resin layer 14 can be formed by curing a resin composition including a urethane (meth)acrylate oligomer, a monomer, a photopolymerization initiator and a silane coupling agent. Prior art techniques can be used for a resin composition for the primary resin layer. A urethane (meth)acrylate oligomer, a monomer, a photopolymerization initiator and a silane coupling agent may be appropriately selected from compounds exemplified in the above base resin. The resin composition constituting the primary resin layer has composition different from the base resin forming the secondary resin layer.

EXAMPLES

Hereinafter, the results of evaluation test using Examples and Comparative Examples according to the present disclosure will be shown, and the present disclosure is described in more detail. The present invention is not limited to these examples.

[Resin Composition for a Secondary Resin Layer]
(Oligomer)

As the oligomer, a urethane acrylate oligomer (UA) obtained by reacting a polypropylene glycol having a molecular weight of 600, 2,4-tolylene diisocyanate and hydroxyethyl acrylate, and an epoxy acrylate oligomer (EA) were prepared.

(Monomer)

Isobornyl acrylate (trade name "IBXA" of Osaka Organic Chemical Industry Ltd.), tripropylene glycol diacrylate (trade name "TPGDA" of Daicel Allnex Ltd.), and 2-phenoxyethyl acrylate (trade name "Light Acrylate PO-A" of Kyoeisha Chemical Co., Ltd.) were prepared as the monomer.

(Photopolymerization Initiator)

As the photopolymerization initiator, 1-hydroxycyclohexyl phenyl ketone and 2,4,6-trimethylbenzoyldiphenylphosphine oxide were prepared.

(Inorganic Oxide Particles)

A silica sol (MEK dispersion solution) including lump-shaped aggregated silica particles in which gas phase method silica particles were surface-treated with 3-methacryloxypropyltrimethoxysilane to introduce a methacryloyl group and a silica sol (MEK dispersion solution) including spherical silica particles in which liquid phase method silica particles were surface-treated with 3-methacryloxypropyltrimethoxysilane to introduce a methacryloyl group were prepared as the inorganic oxide particles.

(Resin Composition)

45 parts by mass of UA, 13.5 parts by mass of EA, 10 parts by mass of POA, 9 parts by mass of IBXA, 22.5 parts by mass of TPGDA, 0.5 parts by mass of 2,4,6-trimethylbenzoyldiphenylphosphine oxide, and 0.5 parts by mass of 1-hydroxycyclohexyl phenyl ketone were mixed to prepare a base resin.

Next, the silica sol was mixed with the base resin so as to have the content of the silica particles shown in Table 1 or Table 2, and then most of MEK as a dispersion medium was removed under reduced pressure to produce resin compositions of Examples and Comparative Examples.

Figure 2:
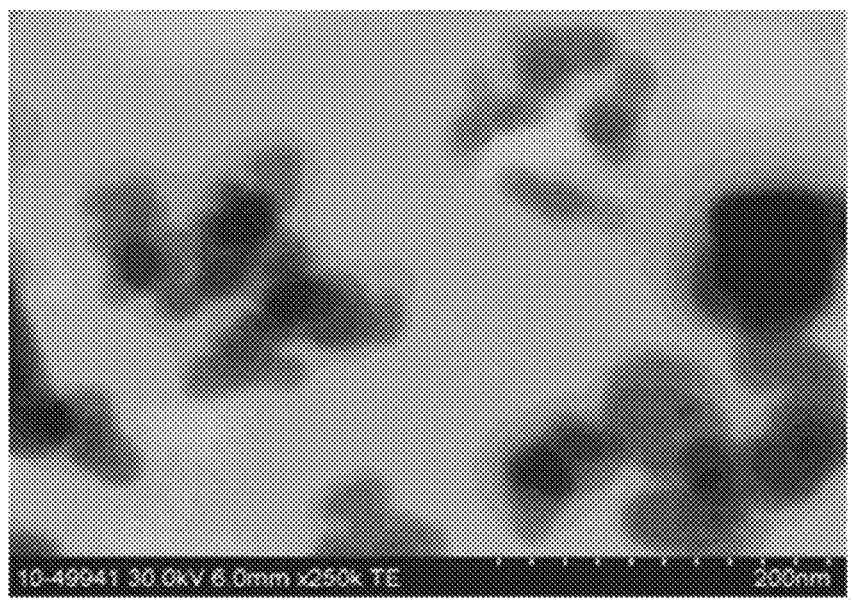
FIG. 2 is an SEM photograph showing the dispersion condition of the inorganic oxide particles used in Example 2.
Figure 3:
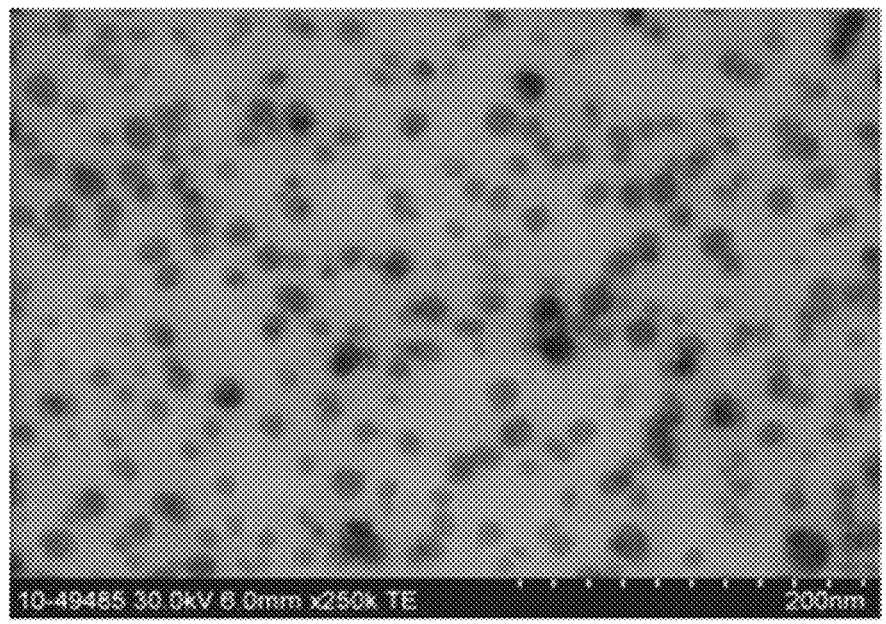
FIG. 3 is an SEM photograph showing the dispersion condition of the inorganic oxide particles used in Comparative Example 2.

FIG. 2 is a scanning electron microscope (SEM) photograph showing the dispersion condition of the inorganic oxide particles used in Example 2. It can be confirmed from FIG. 2 that the inorganic oxide particles used in Examples are dispersed in the condition of lump-shaped aggregated particles. FIG. 3 is an SEM photograph showing the dispersion condition of the inorganic oxide particles used in Comparative Example 2. It can be confirmed from FIG. 3 that the inorganic oxide particles used in Comparative Example 2 are dispersed in the condition of spherical primary particles.

(X-Ray Small Angle Scattering Measurement)

The resin compositions obtained in Examples and Comparative Examples were injected into borosilicate glass capillaries having a length of 8 mm and 2 mm φ by using a syringe. Then, the opening of the glass capillaries were sealed with clay to obtain samples for measurement. X-rays were perpendicularly incident on the sample for measurement, and X-rays scattered backward from the sample at a minute angle (small angle) of 5 degrees or less with respect to the incident X-rays were measured by a two-dimensional detector. The two-dimensional detector acquired a scattering pattern scattered in a 360° direction.

The scattering pattern was acquired by mainly using the beam line "BL8S3" of Aichi Synchrotron Radiation Center for a region where the size of silica particles was small (approximately less than 50 nm), and using the beam line "BL8S3" of Aichi Synchrotron Radiation Center and the beam line "BL19B2" of SPring-8 for a region where the size of silica particles was large (approximately 50 nm or more). The respective experimental conditions were as follows.

"BL8S3": X-ray energy of 13.5 keV, camera length of 4 in, detector of R-AXISIV++

"BL19B2": X-ray energy of 18 keV, camera length of 42 in, detector of PILATUS 2M.

The X-ray scattering intensity profile obtained as described above was analyzed by using particle size/pore analysis software "NANO-Solver, Ver. 3.7" (manufactured by Rigaku Corporation). More specifically, fitting was performed by a nonlinear least squares method so that the measured X-ray scattering intensity and the value of the X-ray scattering intensity calculated by the analysis software were approximate to each other. From the fitting results, the volume average particle size of the inorganic oxide particles and the normalized dispersion thereof were calculated. In the analysis, it was assumed that the inorganic oxide particles were completely spherical.

[Resin Composition for Primary Resin Layer]
(Oligomer)

A urethane acrylate oligomer obtained by reacting polypropylene glycol with a molecular weight of 4000, isophorone diisocyanate, hydroxyethyl acrylate, and methanol was prepared.

(Resin Composition) 75 parts by mass of the urethane acrylate oligomer, 12 parts by mass of a nonylphenol EO-modified acrylate, 6 parts by mass of N-vinylcaprolactam, 2 parts by mass of 1,6-hexanediol diacrylate, 1 part by mass of 2,4,6-trimethylbenzoyldiphenylphosphine oxide, and 1 part by mass of 3-mercaptopropyltrimethoxysilane were mixed to produce a resin composition for the primary resin layer.

[Production of an Optical Fiber]

The resin composition for the primary resin layer and the resin composition of Examples or Comparative Examples for the secondary resin layer were applied to the outer periphery of a 125 μm diameter glass fiber composed of a core and a cladding, and then the resin composition was cured by irradiating with ultraviolet rays and a primary resin layer with a thickness of 35 μm and a secondary resin layer with a thickness of 25 μm around the outer periphery thereof were formed to produce an optical fiber. A linear speed was 1500 m/min.

(Young's Modulus of the Secondary Resin Layer)

The Young's modulus of the secondary resin layer was determined from 2.5% secant value by using a pipe-shaped coating resin layer (length: 50 mm or more) obtained by taking out a glass fiber from an optical fiber to perform a tensile test (distance between marked lines: 25 mm) in an environment of 23±2° C. and 50±10% RH.

(Rewinding Rate)

The rate at which the transmission loss increased when the optical fiber was rewound from the large bobbin to the small bobbin was defined as the rewinding rate. The case where the rewinding rate was 0% was evaluated as "A", the case where the rewinding rate was more than 0% and less than 30% was evaluated as "B", and the case where the rewinding rate was 30% or more was evaluated as "C".

TABLE 1

|  | Example | | | | | | | |
|---|---|---|---|---|---|---|---|---|
|  | 1 | 2 | 3 | 4 | 5 | 6 | 7 | 8 |
| Content of silica particles (% by mass) | 30 | 30 | 30 | 1 | 30 | 60 | 30 | 30 |
| Specific surface area (m²/g) | 200 | 100 | 100 | 100 | 50 | 200 | 10 | 200 |
| Volume average particle size (nm) | 30 | 90 | 95 | 90 | 150 | 30 | 700 | 30 |
| Normalized dispersion (%) | 85 | 55 | 57 | 55 | 60 | 85 | 80 | 45 |
| Young's modulus (MPa) | 2200 | 2000 | 2200 | 1350 | 1900 | 3500 | 1800 | 2300 |
| Rewinding rate | A | A | A | A | A | A | A | A |

TABLE 2

|  | Comparative Example | |
|---|---|---|
|  | 1 | 2 |
| Content of silica particles (% by mass) | — | 30 |
| Specific surface area (m²/g) | — | 65 |
| Volume average particle size (nm) | — | 62 |
| Normalized dispersion (%) | — | 19 |
| Young's modulus (MPa) | 1100 | 1600 |
| Rewinding rate | C | B |

REFERENCE SIGNS LIST

10: Optical fiber, 11: Core, 12: Cladding, 13: Glass fiber, 14: Primary resin layer, 15: Secondary resin layer, 16: Coating resin layer.

The invention claimed is:

1. A resin composition for coating an optical fiber, the resin composition comprising:
    a base resin containing an oligomer, a monomer, and a photopolymerization initiator; and
    inorganic oxide particles,
    wherein the inorganic oxide particles are lump-shaped aggregated particles, and a volume average particle size of the inorganic oxide particles measured by an X-ray small angle scattering method is 5 nm or more and 800 nm or less,
    wherein the inorganic oxide particles are subjected to hydrophobic treatment, and
    wherein a content of the inorganic oxide particles is 5% by mass or more and 60% by mass or less based on a total amount of the oligomer, the monomer, and the inorganic oxide particles.

2. The resin composition according to claim 1, wherein a normalized dispersion of the volume average particle size is 40% or more.

3. The resin composition according to claim 1, wherein the content of the inorganic oxide particles is 10% by mass or more.

4. The resin composition according to claim 1, wherein the inorganic oxide particles are particles comprising at least one selected from the group consisting of silicon dioxide, zirconium dioxide, aluminum oxide, magnesium oxide, titanium oxide, tin oxide, and zinc oxide.

5. A secondary coating material for an optical fiber, comprising the resin composition according to claim 1.

6. An optical fiber comprising:
    a glass fiber comprising a core and a cladding;
    a primary resin layer being in contact with the glass fiber and coating the glass fiber; and
    a secondary resin layer coating the primary resin layer, wherein the secondary resin layer comprises a cured product of the resin composition according to claim 1.

7. An optical fiber comprising:
a glass fiber comprising a core and a cladding;
a primary resin layer being in contact with the glass fiber and coating the glass fiber; and
a secondary resin layer coating the primary resin layer,
wherein the secondary resin layer comprises inorganic oxide particles, the inorganic oxide particles are lump-shaped aggregated particles, and a volume average particle size of the inorganic oxide particles measured by a X-ray small angle scattering method is 5 nm or more and 800 nm or less,
wherein the inorganic oxide particles are subjected to hydrophobic treatment, and
wherein a content of the inorganic oxide particles is 5% by mass or more and 60% by mass or less.

8. A method for manufacturing an optical fiber, comprising:
an application step of applying the resin composition according to claim 1 to an outer periphery of a glass fiber composed of a core and a cladding; and
a curing step of curing the resin composition by irradiating with ultraviolet rays after the application step.

9. A secondary coating material for an optical fiber, comprising the resin composition according to claim 2.

10. A secondary coating material for an optical fiber, comprising the resin composition according to claim 3.

11. A secondary coating material for an optical fiber, comprising the resin composition according to claim 4.

12. An optical fiber comprising:
a glass fiber comprising a core and a cladding;
a primary resin layer being in contact with the glass fiber and coating the glass fiber; and
a secondary resin layer coating the primary resin layer,
wherein the secondary resin layer comprises a cured product of the resin composition according to claim 2.

13. An optical fiber comprising:
a glass fiber comprising a core and a cladding;
a primary resin layer being in contact with the glass fiber and coating the glass fiber; and
a secondary resin layer coating the primary resin layer,
wherein the secondary resin layer comprises a cured product of the resin composition according to claim 3.

14. An optical fiber comprising:
a glass fiber comprising a core and a cladding;
a primary resin layer being in contact with the glass fiber and coating the glass fiber; and
a secondary resin layer coating the primary resin layer,
wherein the secondary resin layer comprises a cured product of the resin composition according to claim 4.

15. A method for manufacturing an optical fiber, comprising:
an application step of applying the resin composition according to claim 2 to an outer periphery of a glass fiber composed of a core and a cladding; and
a curing step of curing the resin composition by irradiating with ultraviolet rays after the application step.

16. A method for manufacturing an optical fiber, comprising:
an application step of applying the resin composition according to claim 3 to an outer periphery of a glass fiber composed of a core and a cladding; and
a curing step of curing the resin composition by irradiating with ultraviolet rays after the application step.

17. A method for manufacturing an optical fiber, comprising:
an application step of applying the resin composition according to claim 4 to an outer periphery of a glass fiber composed of a core and a cladding; and
a curing step of curing the resin composition by irradiating with ultraviolet rays after the application step.

* * * * *